Nov. 19, 1935.  E. J. REH  2,021,381

METHOD OF MAKING LENSES

Filed Jan. 13, 1934

EDWARD J. REH
INVENTOR

BY
ATTORNEY

Patented Nov. 19, 1935

2,021,381

UNITED STATES PATENT OFFICE 2,021,381

METHOD OF MAKING LENSES

Edward J. Reh, Rochester, N. Y., assignor to Bausch & Lomb Optical Company, Rochester, N. Y., a corporation of New York Application January 13, 1934, Serial No. 706,450

4 Claims. (Cl. 88—54)

This invention relates to ophthalmic lenses and more particularly it has reference to an ophthalmic lens whose light transmission is greatest at the central portion and gradually decreases from the center to the periphery. In such a type of lens the variation in transmission may be provided by an annular colored member of glass whose thickness increases from the center outwardly.

One of the objects of this invention is to provide an improved method of making lenses of the type described. Another object is to provide an improved lens blank and method of making same, from which blank lenses of the type described can be ground. A further object is to provide means whereby the size of the central portion of such a lens can be readily controlled in manufacture. These and other objects and advantages reside in certain novel features of construction, arrangement and combination of parts and in the method of constructing, arranging and combining same as will hereinafter be more fully disclosed and pointed out in the appended claims.

Referring to the drawing.

Lenses of the type described usually have a substantially circular central portion which is colorless or only slightly tinted and a surrounding colored or tinted zone whose density decreases from the periphery inwardly to the center so that the light transmission of the lens decreases from the center outwardly to the periphery. In one method of making such a lens a colored glass blank is fused in superposed relation on a second glass blank which is substantially colorless or only slightly tinted. The central portion of the colored blank is then ground away until the colorless (or slightly tinted) blank is exposed so that the lens will have a substantially circular central portion which is colorless (or slightly tinted) and an outer surrounding colored zone whose color density increases from the center towards the periphery. In making a lens by this method on a commercial scale it is quite difficult to control the diameter of the central portion of greater transmission since the lens grinder is apt to grind too much or too little off the colored blank.

Figure 1:
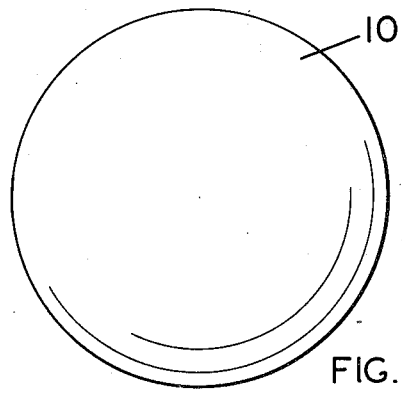
Figs. 1 and 2 show elevation and sectional views, respectively, of a blank of clear or colored glass to be used in making my improved lens blank.
Figure 3:
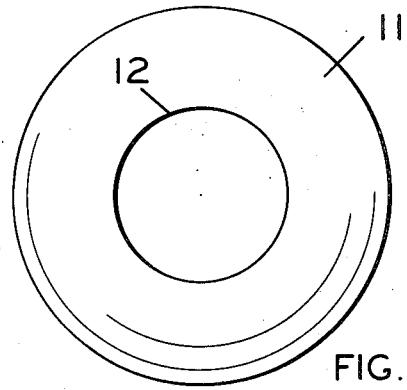
Figs. 3 and 4 show elevation and sectional views, respectively, of a colored or tinted blank of glass used in making my lens blank.
Figure 2:
Figure 4:
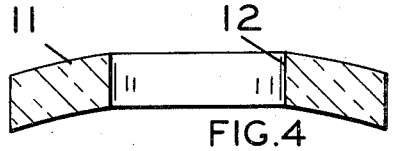
Figure 5:
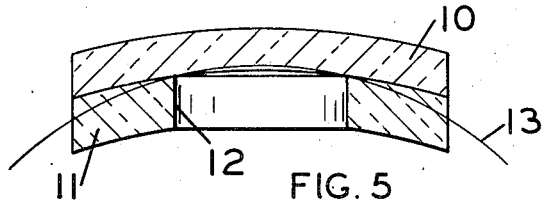
Fig. 5 shows a sectional view of the two glass blanks fused together in superposed relation.
Figure 6:
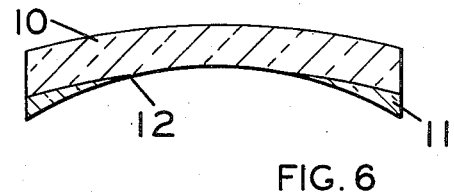
Figs. 6 and 7 shows sectional and elevation views, respectively, of the finished lens made by my process.
Figure 7:
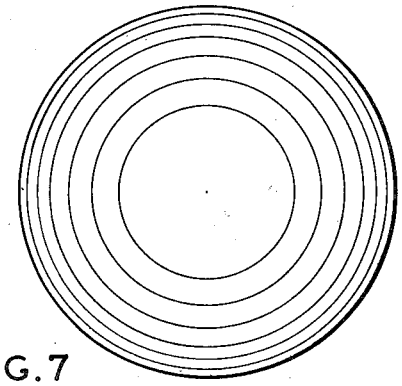

In order to overcome this difficulty I make up a lens blank by securing together in superposed relation, as by fusing, for example, the colorless or slightly tinted blank 10 and the colored blank 11. The colored blank 11 is provided with a centrally disposed aperture 12 whose diameter is substantially the same as that desired for the central portion of the finished lens. The colored member 11 is then ground and polished along the line 13 so as to provide the finished lens shown in Figs. 6 and 7. The surface grinder can readily control the size of the central portion since he grinds away the member 11 until the wall of aperture 12 just disappears.

From the foregoing it will be apparent that I am able to attain the objects of my invention and provide an improved lens blank and method of making lenses whose light transmission varies from the center outwardly. The blank 10 can either be made of colorless glass or of slightly tinted glass and the blank 11 will of course be of a denser color than blank 10. Besides facilitating manufacture, it will be obvious that some glass will be saved since the glass member 11, preferably a pressing, has a central aperture. Various modifications can obviously be made without departing from the spirit of my invention.

I claim:

1. A method of making ophthalmic lenses which comprises forming a centrally disposed walled aperture in a blank of colored glass, fusing said colored blank to a piece of glass and grinding away the central portion of said colored blank until the wall of said aperture just disappears.

2. A method of making ophthalmic lenses which comprises forming a centrally disposed aperture in a blank of colored glass, securing said colored blank to a glass blank in superposed relation and using said aperture as a guide while grinding away the central portion of said blank of colored glass.

3. An ophthalmic lens blank comprising a glass blank and a colored glass blank fused thereto, said last named blank having a centrally disposed walled aperture, said blanks having substantially coextensive areas.

4. An ophthalmic lens blank comprising a clear glass blank and a colored glass blank superposed on said clear glass blank and secured thereto, said colored glass blank having a centrally disposed circular walled aperture.

EDWARD J. REH.